US007434963B2

(12) United States Patent
Kaminski et al.

(10) Patent No.: US 7,434,963 B2

(45) Date of Patent: Oct. 14, 2008

(54) LIGHTING SYSTEM AND OPTICAL PROJECTION STRUCTURE THEREFORE

(75) Inventors: Mark E. Kaminski, Tucson, AZ (US); Matthew B Dubin, Tucson, AZ (US); Mark R. Fink, Tucson, AZ (US)

(73) Assignee: Breault Research Organization, Inc., Tucson, AZ (US)

( * ) Notice: Subject to any disclaimer, the term of this patent is extended or adjusted under 35 U.S.C. 154(b) by 8 days.

(21) Appl. No.: 11/286,988

(22) Filed: Nov. 23, 2005

(65) Prior Publication Data

US 2007/0115655 A1 May 24, 2007

(51) Int. Cl.
*H01G 5/06* (2006.01)

(52) U.S. Cl. ....................... 362/293; 362/231; 362/235; 362/244; 362/245; 362/227

(58) Field of Classification Search ....................... None
See application file for complete search history.

(56) References Cited

U.S. PATENT DOCUMENTS 5,751,384 A 5/1998 Sharp
5,929,946 A 7/1999 Sharp et al.
5,953,083 A 9/1999 Sharp
5,990,996 A 11/1999 Sharp
5,999,240 A 12/1999 Sharp et al.
6,283,613 B1 * 9/2001 Schaffer ..................... 362/245
6,379,022 B1 * 4/2002 Amerson et al. ............ 362/231
6,714,186 B1 * 3/2004 Mosier et al. ............... 345/104
7,025,474 B2 * 4/2006 Campbell et al. ........... 362/231
7,220,039 B2 * 5/2007 Ahn et al. ................... 362/612

* cited by examiner

*Primary Examiner*—Sharon Payne
*Assistant Examiner*—Kristen A Manskar
(74) *Attorney, Agent, or Firm*—Lawrence R. Oremland, P.C.

(57) ABSTRACT

A new lighting system is provided that is particularly useful in projecting light to a deck where pilots use night vision goggles (NVGs). The system comprises a pair of subsystems that project light with different, complementary spatial distributions. One subsystem projects light with one spatial distribution, and the other lighting subsystem projects light with another spatial distribution that supplements the light from the first subsystem, so as to provide a system that effectively illuminates an entire target. The system is designed to substantially filter light so that the light does not interfere with NVGs. The system includes new optical projection structure that minimizes the overall size of the projection structure, and maintains good efficiency.

16 Claims, 4 Drawing Sheets

Prior Art

Current Invention

LIGHTING SYSTEM AND OPTICAL PROJECTION STRUCTURE THEREFORE

GOVERNMENT RIGHTS

This invention may have been at least partially supported by funding under U.S. government SBIR Contract No. N65538-04-M-0098 awarded by the Department of the Navy, Naval Sea Logistics Center (NAVSEA). The government may have some rights in this invention.

BACKGROUND

The present invention relates to a new and useful lighting system that is particularly useful as a floodlighting system for a space such as the deck of a ship, and to a new and useful optical projection structure for a lighting system.

Current deck lamps use incandescent lamps with reflectors. While these systems provide illumination over a broad area, they are deficient in a number of ways. One of the primary issues is that they do not uniformly illuminate the deck. Directly in front of each lamp is a bright spot and the brightness decreases significantly as the distance in increased. In addition, incandescent lamps have limited lifetimes so regular maintenance must be done frequently and the risk of having a deck lamp fail is undesirably high.

An additional problem with current deck lamps is that too much light is directed off of the deck. If the deck lamp is being used on a military ship, any light that misses the deck contributes to the ship's visual signature and makes it easier to see. Finally, current deck lamps produce a significant amount of light that can be detected by night vision goggles (NVGs) which makes NVGs difficult to use. Attempts have been made to insert filters over the deck lamps to allow pilots landing on ships to use NVGs while personnel on the ship still have an adequate level of illumination, but the results are inadequate.

In the applicant's experience, illuminating a ship deck, particularly a ship deck that aircraft may be taking off from and landing on at all hours, presents a number of challenges. There is a need to illuminate a volume space on the ships deck in a way that enables pilots to take off and land at all hours, without interference with the night vision goggles they often use in such maneuvers. In addition, a lighting system needs to be optically effective, as well as cost effective. Moreover, the lighting system should project significant light to a predetermined volume space (e.g. the center of the deck), and in a way that is compatible with pilot's night vision goggles.

SUMMARY OF THE INVENTION

The present invention provides a new and useful lighting system that is designed to address the foregoing issues, and to a new and useful optical projection structure for such a lighting system. The lighting system of the invention is designed to be particularly useful as a lighting system for a deck (e.g. a ship deck), where pilots taking off from or landing on the deck often use night vision goggles. Moreover, the principles of the present invention are also intended to be useful in various other types of applications. The new optical projection structure is particularly useful in the lighting system of the present invention, and may also be useful in other types of lighting systems.

According to the present invention, a lighting system comprises at least a pair of lighting subsystems that project light to a volume space with different spatial distributions. One subsystem projects light to the volume space with a predetermined spatial distribution, and the other lighting subsystem projects light to the volume space with a different spatial distribution, in a manner that effectively supplements the projected light from the first subsystem, so as to provide a lighting system that effectively illuminates the entire volume space.

In one preferred application of the lighting system of the present invention, the lighting system is designed to illuminate the deck of a ship such as a carrier, and from which aircraft land and take off. The system provides a pair of lighting subsystems with different spatial distributions for illuminating the deck, in accordance with the foregoing principles.

Moreover, the system is designed to be particularly compatible with the optical capabilities of night vision goggles. The system is designed to substantially filter out light in a predetermined wavelength band that is "out of band" of night vision goggles (i.e. the wavelength band at which night vision goggles operate), so that the projected light effectively illuminates the deck, and does not interfere with the vision of pilots who are using night vision goggles.

In addition, the lighting system of the present invention is designed to be optically efficient, provide uniform illumination, and be friendly to NVGs and to be cost effective.

Still further, the principles of the present invention, while particularly useful in illuminating a ship deck, can also be used in other types of environments where illumination of a volume space in a manner that also minimizes projection of light in a wavelength band that can have adverse effect for the system is desirable. For example, street lighting systems that also need to minimize light pollution (e.g. because of optical devices in an area of interest) can benefit from the principles of the present invention.

Furthermore, the present invention provides a new and useful optical projection structure, that is particularly useful in projecting light from a source (e.g. an array of light emitting diodes ["LEDs"]) to a volume space, while minimizing the overall size of the projection structure, and maintaining good projection efficiency. The light projection structure comprises a curved reflector segment and a refractor. The curved reflector segment and refractor are in a predetermined light collection relationship to each other, and the source has a predetermined location and angular relation to the curved reflector segment and the refractor that is at least partially based on the focal points of the curved reflector segment and refractor and the light collection relationship of the curved reflector segment and the refractor.

Other features of the present invention will become further apparent from the following detailed description and the accompanying drawings.

DETAILED DESCRIPTION

Figure 1:
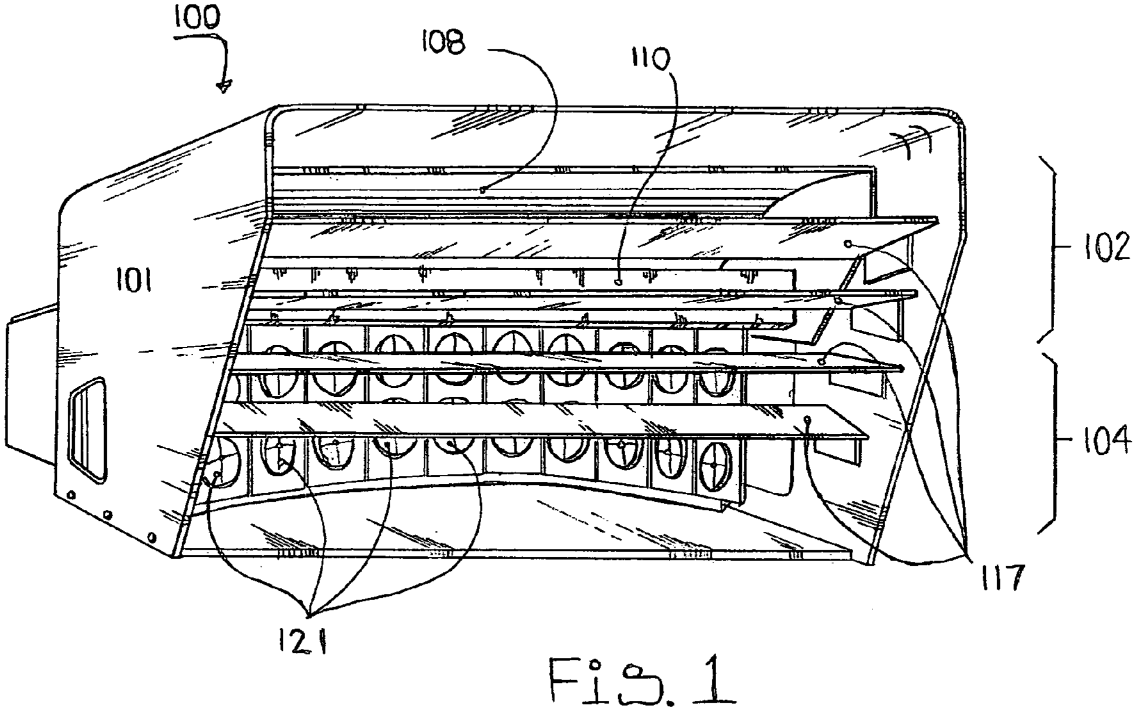
FIG. 1 is a three dimensional view of a deck lighting system, according to the principles of the present invention.
Figure 2:
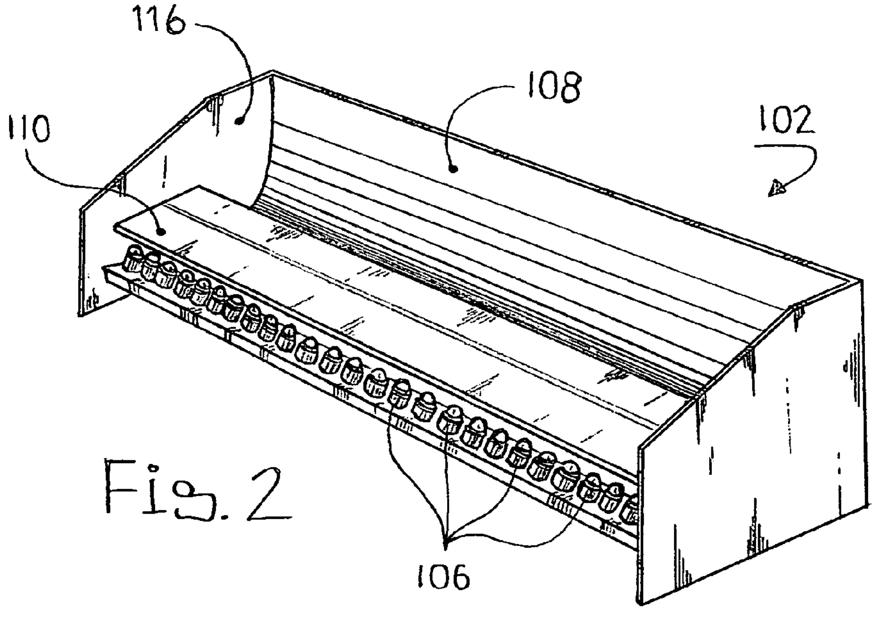
FIG. 2 is a three dimensional view of a first lighting subsystem in a lighting system of the present invention.
Figure 3:
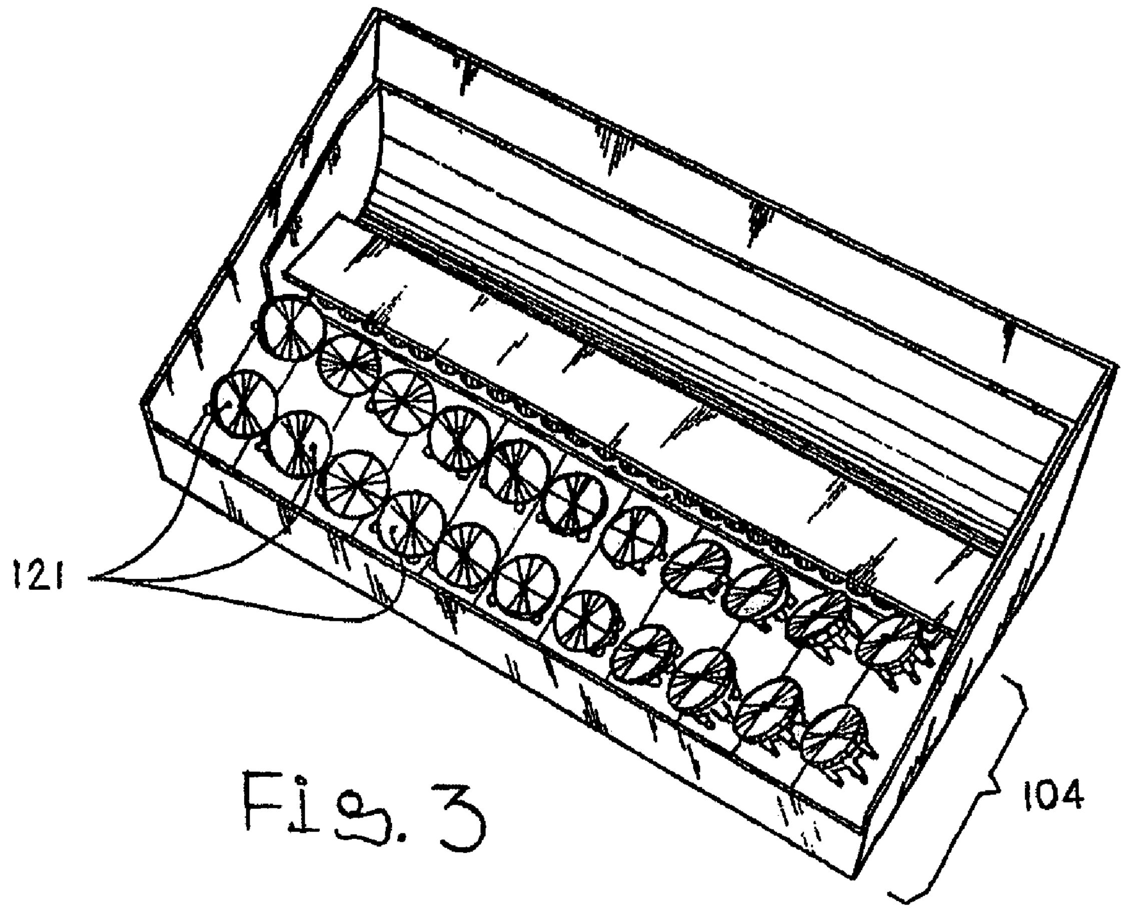
FIG. 3 is a three dimensional view of a second lighting subsystem in a lighting system of the present invention.
Figure 3A:
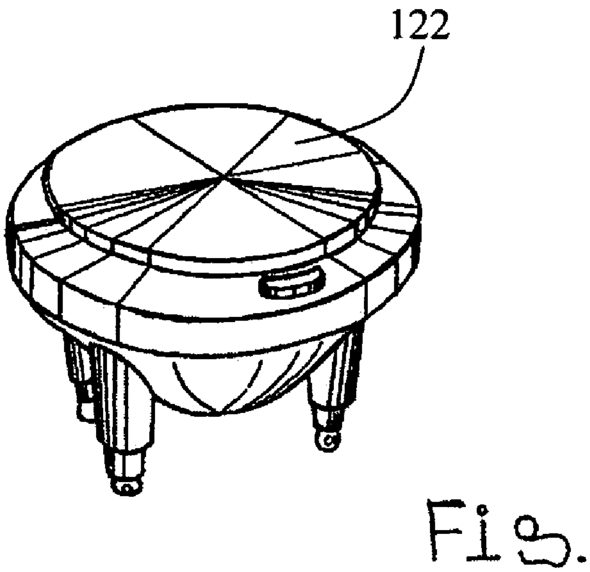
FIG. 3*a* is a three dimensional view of an individual light producing component in the second lighting subsystem.

As discussed above, the present invention provides a new and useful lighting system that is particularly useful as a lighting system for a deck (e.g. a ship deck), and to an optical projection structure that is particularly useful in such a system. The principles of the present invention are described herein in connection with a ship deck lighting system that is designed to illuminate the center of the deck, without interference with pilots' night vision goggles. However, from that description, the manner in which the principles of the present invention can be used with various types of lighting systems will be apparent to those in the art.

A deck lighting system according to the present invention is shown at 100.

The lighting system 100 includes a housing 101 with pair of lighting subsystems 102, 104 therein, and a protective glass cover 105. The lighting subsystem 102 projects light to a deck with a predetermined spatial distribution. The lighting subsystem 104 projects light to the deck with a spatial distribution that is different from the spatial distribution of the lighting subsystem 102. Together, the lighting subsystems 102, 104 project light to the deck in a manner that illuminates a portion of the deck, and in a wavelength band that is compatible with night vision goggles.

The lighting subsystem 102 includes a new optical projection structure, according to the principles of the present invention. The lighting subsystem 102 comprises (i) a source comprising first array of light emitting diodes (LEDs) 106, (ii) optical projection structure 107 associated with the first array 106 of LEDs, comprising a curved reflector segment 108 and collimator (or refractor) 110, and (iii) a filter 112 associated with the first array of LEDs. The first array of LEDs 106 is configured to generate light in a predetermined wavelength range (e.g. 575 nm to 450 nm or 525 nm to 425 nm) that is generally compatible with night vision goggles. The filter 112 is configured to substantially filter out light in a predetermined wavelength band (e.g. the light may be filtered to substantially attenuate light with a wavelength longer than 550 nm), that further reduces any light in the cyan waveband that is within the waveband of the night vision goggles. Thus, the filtered light is effectively "out of band" of the night vision goggles (i.e. it is completely out of a waveband that could interfere with the night vision goggles). It is also contemplated that if the light source can produce light in a wavelength range that is completely "out of band" of night vision goggles (or other wavelength range that completely eliminates light in a wavelength range that is undesirable), the filter can effectively pass all of the light from the array of LEDs. The optical projection device 107 projects the light to the center of the deck with a predetermined spatial distribution that is determined by the requirements of the user.

Preferably the curved light reflecting segment 108 reflects a portion of the light from the array of LEDs and the light refracting component 110 refracts (or reflects using total internal reflection and then refracts) a portion of the light from the array 106 of LEDs. The curved light reflecting segment 108 preferably comprises an extruded, concave parabolic reflector segment.

In the lighting subsystem 102 one preferred embodiment is to have curved reflector segment 108 or collimator 110 have constant cross section. An optic with constant cross section can be described with a cross section and a curve along which the cross section is swept. In the preferred embodiment, the curve the cross section is swept along is substantially defined by the curve connecting the centers of each LED in the array of light emitting diodes 106. It is also contemplated that the curve along which the cross section can be swept along can be a straight line segment, a smooth curve or a piecewise defined curve, as will be appreciated by those in the art. An additional preferred embodiment is for both the curved reflector segment 108 and collimator 110 to have constant cross sections.

Figure 4:
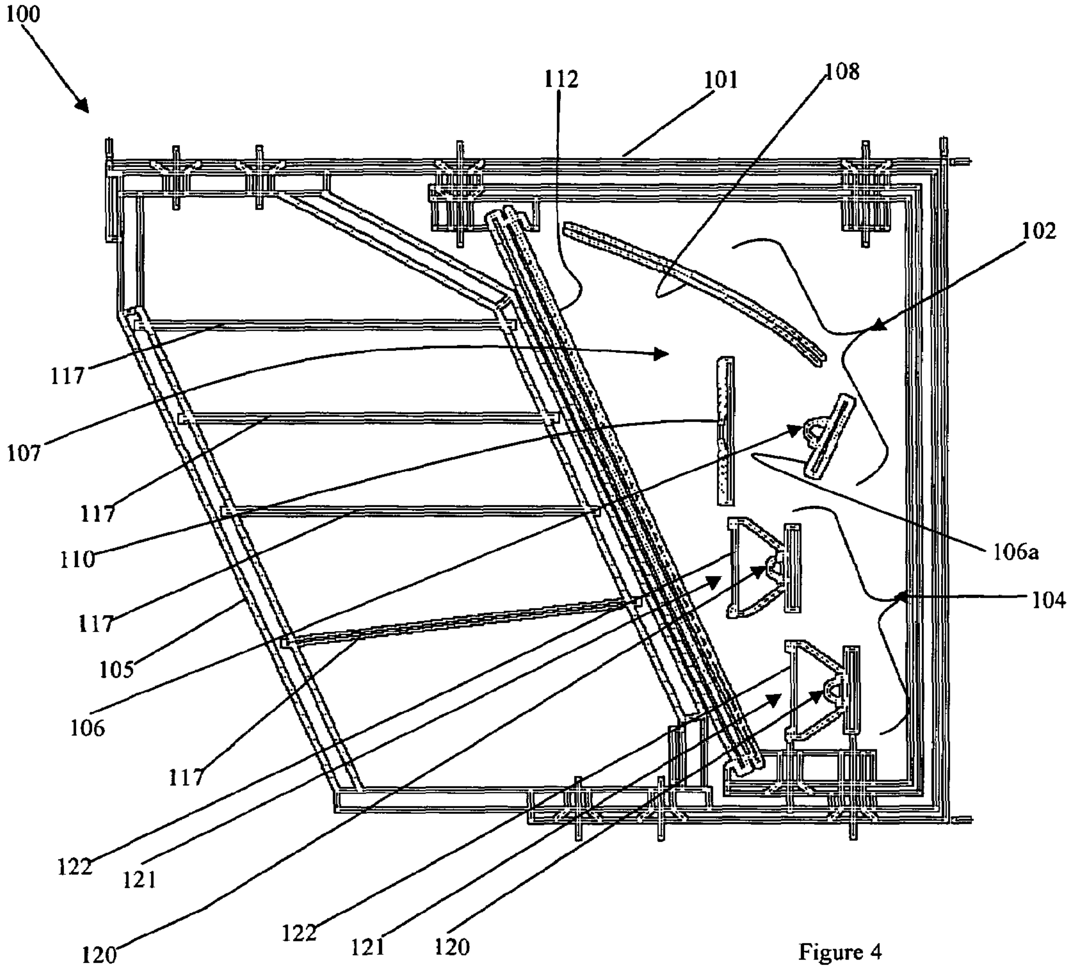
FIG. 4 is a side view of components of a lighting system according to the present invention.
Figure 7:
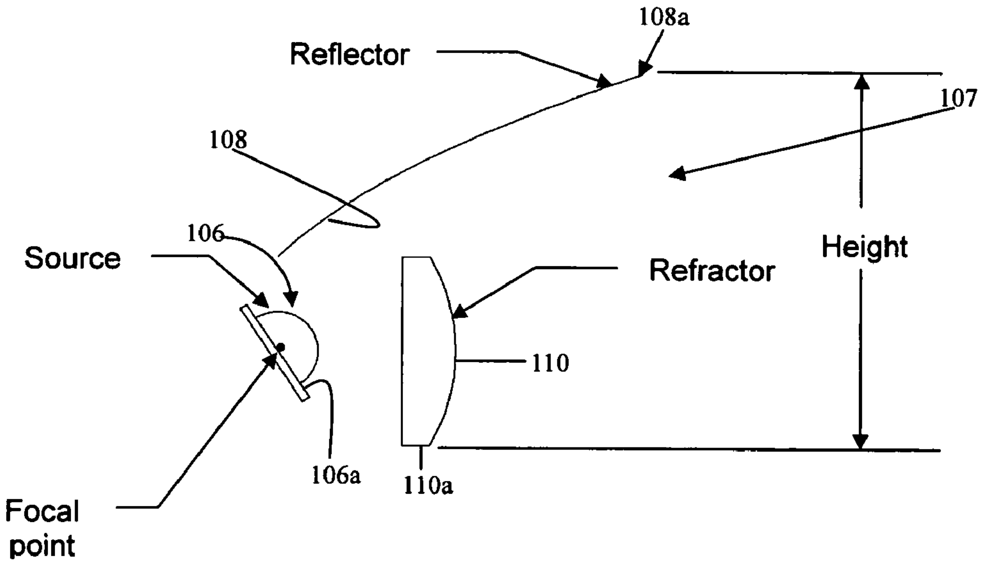
FIG. 7 is a schematic illustration of the principles of a new optical projection structure, according to the present invention.

As can be appreciated by reference to FIGS. 4 and 7, the curved reflector segment 108 and refractor 110 are in a predetermined light collection relationship to each other, preferably one in which their focal points coincide. The source, i.e. the array of LEDs 106, has a predetermined location and angular relation to the curved reflector segment 108 and the refractor 110 that is at least partially based on the focal points of the curved reflector segment 108 and refractor 110 and the light collection relationship of the curved reflector segment 108 and the refractor 110. In this application, reference to the "light collection" relationship of the curved reflector segment and the refractor is the three dimensional space over which the curved reflector segment and refractor can collect light from a light source that is at or proximate to a common focal point for the curved reflector segment and refractor. Also, as can be appreciated from the foregoing discussion, the curved reflector segment has a distal end 108*a*, and the refractor has a peripheral surface 110*a*, and the height of the light projection structure (shown at H in FIG. 7) s determined by the relationship of the distal end of the curved reflector segment 108 and the peripheral surface of the refractor 110

Figure 6:
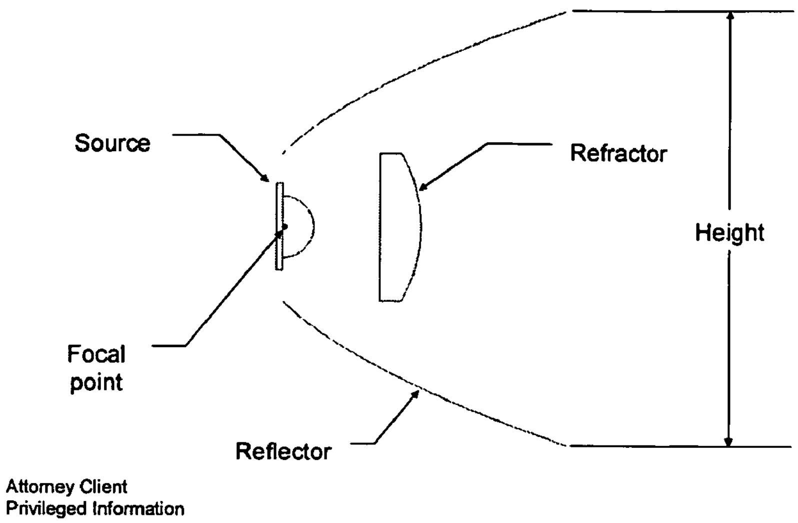
FIG. 6 is a schematic illustration of a prior type of optical projection structure.

Some of the useful features of the optical projection structure described above can be appreciated from a comparison of FIGS. 6 and 7. FIG. 6 shows a known type of optical projection structure, and FIG. 7 shows the new optical projection structure of the present invention. One of the advantages of the optical projection structure of the present invention is its short vertical height. The prior optical projection structure of FIG. 6 provides a collimator designed to collect light over a full hemisphere. The two main components to the collimator are the reflector and the refractor.

Typically the reflector is a full parabolic mirror and the refractor is a lens.

Both have well defined focal points and the optics are typically designed so that the focal points are coincident. The source is placed proximate to the focal points and the light exiting the source is reflected or refracted such that the light is contained within a cone around the axis of symmetry when it leaves the system. Obviously, the reflector does not have to be parabolic and the refractor does not have to collimate the light well. These devices can be rotationally symmetrical to collimate the light in both directions, or they can be extrusions to collimate the light in one direction only.

The problem with the prior structure of FIG. 6 is that the height of the optics is sometimes too large. This is particularly significant when the system is being used to retrofit an existing design and the size is constrained. This is due to the fact that there is a fixed relationship between the size of the source and its angular distribution and the size of the optic and its angular output. This relationship is called the conservation of étendue. The reflector could be truncated to reduce the height, but the area of the reflector that would be removed is often reflecting a significant amount of power. With the optical projection structure of the present invention, the LED source is rotated (i.e. angled with respect to the reflector segment and refractor, as shown in FIG. 7) and one half of the reflector is removed, so that the reflector 108 is a curved reflector segment. The reason such a projection structure is effective, for purposes of the present invention, is that the amount of light leaving most LEDs that is directed near its horizon (i.e. a path parallel to the surface 106*a*) is typically low. With the optical projection structure of the present invention, by taking advantage of the fact that light is not distributed uniformly in the étendue of the source, the size of the optical projection structure can be reduced, while still maintaining good projection efficiency. The light going towards the horizon is lost, but the reduction in height is significant while the reduction in power is not. In the case of an extruded optical system, the reductions are even smaller because the losses occur in only one direction. Thus, in the plane of the page of FIG. 7, there will be some loss, but there will be no additional loss in an extruded system in and out of the plane of the page. Another advantage to the optical projection structure of the present invention is that the sources can be placed in close proximity in the direction of the extrusion. When this is done, the light from multiple sources (i.e. an array of LEDs 106) will reflect/refract from a given point on the optical structure, resulting in a small, efficient system. With the projection structure of the present invention, a spherical/circular reflector can be added to the end of the parabolic reflecting segment 108 to redirect some of the lost light back into the optical projection structure. If the source is located at the center of this supplemental reflector, light will be directed back to the source and light that bounces off of it will be collected by the reflector or refractor. If the source is not located at the center of the supplemental reflector, the light will miss the source and be directed towards the refractor. This will slightly increase the angular distribution exiting the system, but in many cases, a slight increase in angular distribution is worth a slight increase in collection efficiency.

At least one mirror 116 is associated with the array 106 of LEDs of the lighting subsystem 102. Preferably, there are plural mirrors associated with the lighting subsystem 102, and they are located at the end of each row of LEDs. The mirror(s) create virtual images of the LEDs, thereby to increase the effective size of the array 106 of LEDs. In addition, with a ship deck lighting system, baffles or louvers 117 (FIGS. 4, 7), which are supported by housing 101, may be included as part of the lighting system 101, to block light from being directed upward toward pilots or other personnel.

The other lighting subsystem 104 comprises a second array of light producing components 121, each of which preferably comprises an LED 120 and an optic 122 (e.g. a collimator or refractor) associated with the LED. Rather than individual optics 122, a common optic can be associated with the second array of LEDs 120. In addition, the filter 112 may also function as a filter for the second array of LEDs 120 (or an individual filter can be associated with each of the second arrays of LEDs 120). The optic(s) associated with the LEDs 120 could be separate parts or some or all of the optic(s) could be formed from one piece. If two or more optics are formed from the same piece, there will be a variation in the shape of the optics to match the spacing of the LEDs 120. While the preferred embodiment has the same spacing between the LEDs 120 and the variations in the shape of the optics, it is not necessary for the spacings to match. In some cases, a mismatch between the spacings can be used to direct light in different directions from different LEDs 120. This would allow for the LEDs 120 to be mounted on a flat surface while still allowing for the light from each LED 120 to be aimed in different directions. In another preferred embodiment, more than one LED 120 is associated with each individual optic. For example, two, three or more LEDs 120 could be associated with one optic that form part of an array of optics. The filter(s) for the second array of LEDs 120 may be a single filter for the second array of LEDs (i.e. part of the common filter 112), or an individual filter for each of the second array of LEDs 120. The filter(s) and optical devices 122 associated with the second array of LEDs 120 are configured to substantially filter out light in the predetermined wavelength band, e.g. if the LEDs 120 are configured to generate light in the same predetermined wavelength range as the LEDs 106 (e.g. 575 nm to 450 nm or 525 nm to 425 nm) that is generally compatible with night vision goggles, the filter, or filters, are configured to substantially filter out light in a predetermined wavelength band (e.g. the light may be filtered to substantially attenuate light with a wavelength longer than 550 nm), that further reduces any light in the cyan waveband that is within the waveband of the night vision goggles.

The filtered light from the second array of LEDs 120 is projected to the deck with a different spatial distribution than the projected light from the first lighting subsystem 102. Specifically, the filtered light from the second array of LEDs 120 is projected such that their spatial distribution effectively fills in gaps in the light projected from the first array of LEDs 106. Thus, if light from the first array 106 of LEDs is projected to the center of the deck, the light from the second array 120 of LEDs is projected to areas about the first array 106 of LEDs and off to the side of the light projected from the first array 106 of LEDs. This creates a spatial distribution from the second lighting subsystem 104 that differs from the spatial distribution created by the first lighting subsystem 102.

It should be further noted that the position and angle of each of the LEDs 106 of the first array or the LEDs 120 of the second array can be optimized, in accordance with the spatial distribution desired from each of the lighting subsystems. Moreover, the overall optical configuration of the lighting system 100 is preferably optimized by matching the étendue of the sources to the specific areas on the deck to produce an intensity distribution over horizontal and vertical angles and in a tight vertical pattern, to enable the light from the first lighting subsystem 102 to be projected to the volume space in the tight vertical pattern. The angular subtense of the deck center is small relative to the lighting system. The tight vertical pattern is desirable to project sufficient optical power to illuminate the large area of the center of the deck.

The foregoing lighting system is designed for projecting light to the deck of a ship, but the principles of the lighting system can be used in other applications, especially those applications in which it is desirable to project light to a volume space while also filtering out light in an undesirable wavelength. For example, the principles of the present invention can be used in a street lighting system, in an area in which too much reflected light from the ground can effectively cause "light pollution" (e.g. an area that uses powerful optical telescopes that can be affected by such "light pollution").

Figure 5:
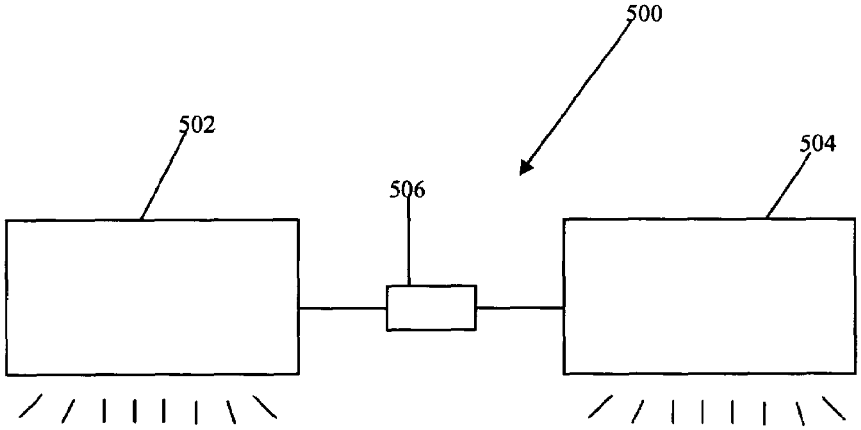
FIG. 5 is a schematic illustration of a dual lighting system, according to one aspect of the present invention.

In addition, the principles of the present invention can be used in lighting systems that can switch between a broad band lighting system and a narrow band lighting system. For example, as illustrated by FIG. 5, the principles of the present invention can be used to form a dual lighting system 500 that comprises (i) a broad band lighting system 502 and a narrow band lighting system 504, and (ii) a switching device 506 that is configured to selectively switch the dual lighting system between the broad band lighting system and the narrow band lighting system. The broad band lighting system 502 would include an array of LEDs and optics for projecting light from the array of LED's to a volume space with a predetermined spatial distribution. The narrow band lighting system 502 would be preferably configured according to the system of FIGS. 1-4 and include (i) a primary array of LEDs, filter and optical projection structure for filtering light in a predetermined wavelength range and projecting the light to the volume space with a predetermined spatial distribution, and (ii) a secondary array of LEDs, optics and filter associated with the secondary array of LEDs and configured to substantially filter out light in a predetermined wavelength band and to project the filtered light to the volume space with a predetermined spatial distribution. The switching device 506 would enable the system to be selectively switched between the broad band lighting system 502 and the narrow band lighting system Accordingly, the foregoing description provides a lighting system that is particularly useful as a deck lighting system for a ships deck, and which also has application in other types of lighting systems. Moreover, it will be apparent to those in the art that modifications of the lighting system and/or light projection structure described above can be made in accordance with the principles of the present invention. For example, while a parabolic, concave reflector segment 108 is disclosed above, it will be apparent to those in the art that other curved reflector segment configurations (e.g. curved concave spherical reflector segment, curved compound reflector segment that may have concave or other configurations) can also be used in an optical projection structure according to the present invention. In addition, while the cover (or window) 105 and filter 112 are illustrated as separate components, it is contemplated that the filter can be integrally formed with the window. Also, it is also possible to use a source with a broad spectral band and filter the light with an electronically controlled color filter. For example, one type of color filter that can be used is produced by ColorLink, Inc., Boulder, Colo., distributed under the mark ColorSelect, and uses polarization and technology called retarder stack technology that selectively rotate additive or subtractive color bands. Such retarder stack technology is described in U.S. Pat. Nos. 5,929,946; 5,953,083; 5,990,996; and/or 5,999,240, each of which is incorporated by reference herein. Another way would be to create a custom filter using filters, produced by ColorLink, Inc., distributed under the mark ColorSwitch, and which use liquid crystal switches configured to chromatically manipulate polarization, and which provide independent electronic control of the RGB transmission levels to provide additive and subtractive primary outputs. Such technology is described in U.S. Pat. Nos. 5,751,384 and/or 5,953,083, each of which is incorporated by reference herein. Another example of an electronically controlled color filter is to construct to incorporate a color filter array in a light valve. A particular example of this is to use a liquid crystal display with individually addressable regions. Different regions will have different color filters associated with them. By adjusting the transmission of the different regions independently, the overall spectral transmission of the filter can be adjusted. Also, an electromechanically controlled color filter could be moved into or out of a beam to adjust the color. In addition, while the preferred embodiment shows lighting subsystems 102, 104 within a common structure (i.e. within housing 101), it is not necessary to have lighting subsystem 104 contained in the same structure that contains lighting subsystem 102. Still further, mirrors 116, while described above in connection with lighting subsystem 102, can be associated with each of the lighting subsystems 102, 104.

With the foregoing disclosure in mind, it is believed that various adaptations of a lighting system and/or an optical projection structure, according to the principles of the present invention, will be apparent to those in the art.

The invention claimed is:

1. A lighting system comprising at least first and second lighting subsystems; wherein a. the first lighting subsystem comprises a first array of LEDs, an optical projection structure comprising an optic with constant cross section that is defined by sweeping the cross section along a curve with two end points and a filter associated with the first array of LEDs, the optic comprising a reflector or a refractor, the first array of LEDs configured to generate light in a predetermined wavelength range, the optic and filter configured to substantially filter out light from the first array of LEDs in a predetermined wavelength band and to project the filtered light from the first array of LEDs to a volume space with a predetermined spatial distribution; and b. the second lighting subsystem configured to supplement the first lighting subsystem and comprising a second array of LEDs with one or more optics associated with the second array of LEDs and filter structure associated with the second array of LEDs, the filter structure and optic(s) associated with the second array of LEDs configured to substantially filter out light in the predetermined wavelength band and to project the filtered light from the second array of LEDs to the volume space with a different spatial distribution than the projected light from the first lighting subsystem;

c. wherein the first and second lighting subsystems are configured to simultaneously project light to the volume space, so that the light from the second lighting subsystem that is projected to the volume space supplements the light from the first lighting subsystem that is directed to the volume space, and d. wherein the optic comprises a curved reflector segment and the optical projection structure comprises the curved reflector and a refractor; the curved reflector segment and refractor being in a predetermined light collection relationship to each other, and the first array of LEDs having a predetermined location and angular relation to the curved reflector segment and the refractor that is at least partially based on the focal points of the curved reflector segment and refractor and the light collection relationship of the curved reflector segment and the refractor.

2. A lighting system as defined in claim 1, wherein the curved reflector segment is a concave reflector segment.

3. A lighting system as defined in claim 1, wherein the curved reflector segment is a concave parabolic reflector segment.

4. A lighting system as defined in claim 1, wherein the curved reflector segment has a distal end, and the refractor has a peripheral surface, and wherein the height of the optical projection structure is determined by the relationship of the distal end of the curved reflector segment and the peripheral surface of the refractor.

5. A lighting system as set forth in claim 1, wherein the curved reflector segment comprises an extruded concave parabolic reflector segment, and wherein the first lighting subsystem is further configured such that some light from the first array of LEDs reflects off the parabolic reflector segment while some light from the first array of LEDs is collimated through the light refracting component.

6. A lighting system as set forth in claim 2, further including at least one mirror associated with the first array of LEDs of the first lighting subsystem, the mirror located to increase the effective size of the first array of LEDs.

7. A lighting system as set forth in claim 1, wherein LEDs of each of the first and second lighting subsystems generates light in the Cyan wavelength range.

8. A lighting system as set forth in claim 1, wherein the filter structure associated with the second array of LEDs comprises individual filters associated with each of the second array of LEDs.

9. A lighting system as defined in claim 7, wherein the filter associated with the first array of LEDs and the filter structure associated with the second arrays of LEDs are configured to substantially attenuate light with a wavelength longer than 550 nm.

10. A lighting system as set forth in claim 7, wherein a common filter is provided for the first and second lighting subsystems, the common filter associated with the arrays of LEDs of the first and second lighting subsystems configured to substantially attenuate light with a wavelength longer than 550 nm.

11. A lighting system as set forth in claim 1, wherein an adjustable filter is provided for at least one of the first and second lighting subsystems, the adjustable filter configured to adjust the transmission of light from the first and/or second lighting subsystems to substantially attenuate light in the predetermined wavelength range.

12. A lighting system as set forth in claim 11, wherein the adjustable filter is electronically adjustable to substantially attenuate light in the predetermined wavelength range.

13. Apparatus comprising a light source and an optical projection structure comprising a reflector segment and a refractor where one of said reflector segment and refractor is an optic with constant cross section that is defined by sweeping the cross section along a curve with two end points, wherein the reflector segment has a distal end, and the refractor has a peripheral surface, and wherein the entire height of the optical projection structure extends the vertical distance from the distal end of the reflector segment to the peripheral surface of the refractor that is most remote from the distal end of the reflector segment, and where said light source is positioned at an angle with respect to said reflector segment and refractor such that in at least one plane the light ray that is directed from the center of the source in a direction normal to the horizon of the source does not pass through the center of the refractor.

14. Apparatus as defined in claim 13, wherein the curved reflector segment is a concave parabolic reflector segment.

15. Apparatus as defined in claim 13, wherein the curved reflector segment is a concave reflector segment.

16. A lighting system comprising at least first and second lighting subsystems; wherein a. the first lighting subsystem comprises a first array of LEDs, an optical projection structure comprising an optic with constant cross section that is defined by sweeping the cross section along a curve with two end points and a filter associated with the first array of LEDs, the optic comprising a reflector or a refractor, the first array of LEDs configured to generate light in a predetermined wavelength range, the optic and filter configured to substantially filter out light from the first array of LEDs in a predetermined wavelength band and to project the filtered light from the first array of LEDs to a volume space with a predetermined spatial distribution; and b. the second lighting subsystem configured to supplement the first lighting subsystem and comprising a second array of LEDs with one or more optics associated with the second array of LEDs and filter structure associated with the second array of LEDs, the filter structure and optic(s) associated with the second array of LEDs configured to substantially filter out light in the predetermined wavelength band and to project the filtered light from the second array of LEDs to the volume space with a different spatial distribution than the projected light from the first lighting subsystem;

c. wherein the first and second lighting subsystems are configured to simultaneously project light to the volume space, so that the light from the second lighting subsystem that is projected to the volume space supplements the light from the first lighting subsystem that is directed to the volume space, and d. wherein the optical projection structure of the first lighting subsystem comprises a reflector segment and a refractor where one of said reflector segment and refractor is the optic with constant cross section that is defined by sweeping the cross section along a curve with two end points, wherein the reflector segment has a distal end, and the refractor has a peripheral surface, and wherein the entire height of the projection structure extends the vertical distance from the distal end of the reflector segment to the peripheral surface of the refractor that is most remote from the distal end of the reflector segment, and where each LED of said first array is positioned at an angle with respect to said reflector segment and refractor such that in at least one plane the light ray that is directed from the center of the LED in a direction normal to the horizon of the LED does not pass through the center of the refractor.

* * * * *